Nov. 3, 1931.   B. C. SKINNER   1,830,297
SPRAYING APPARATUS
Filed May 13, 1929   2 Sheets-Sheet 1
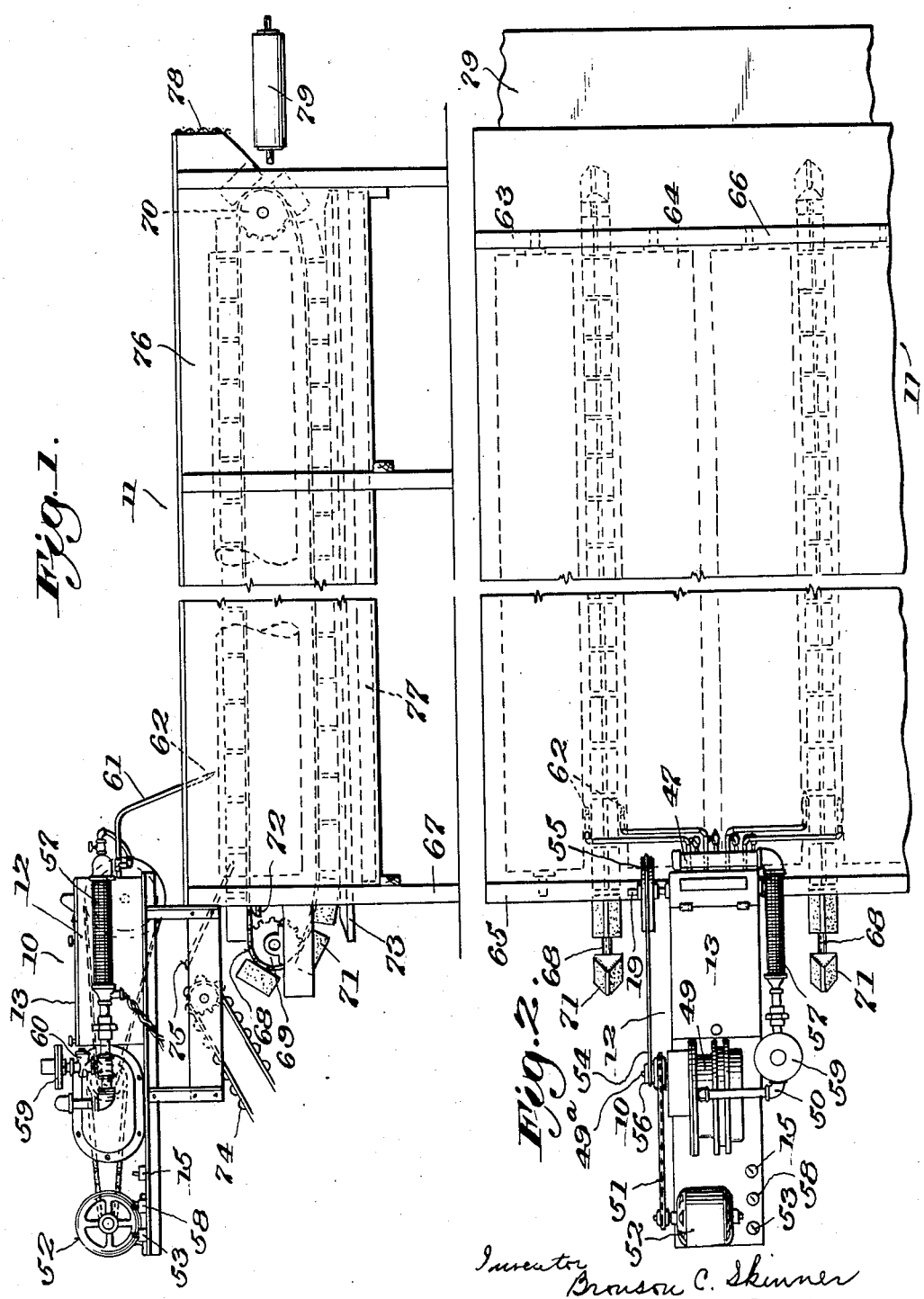

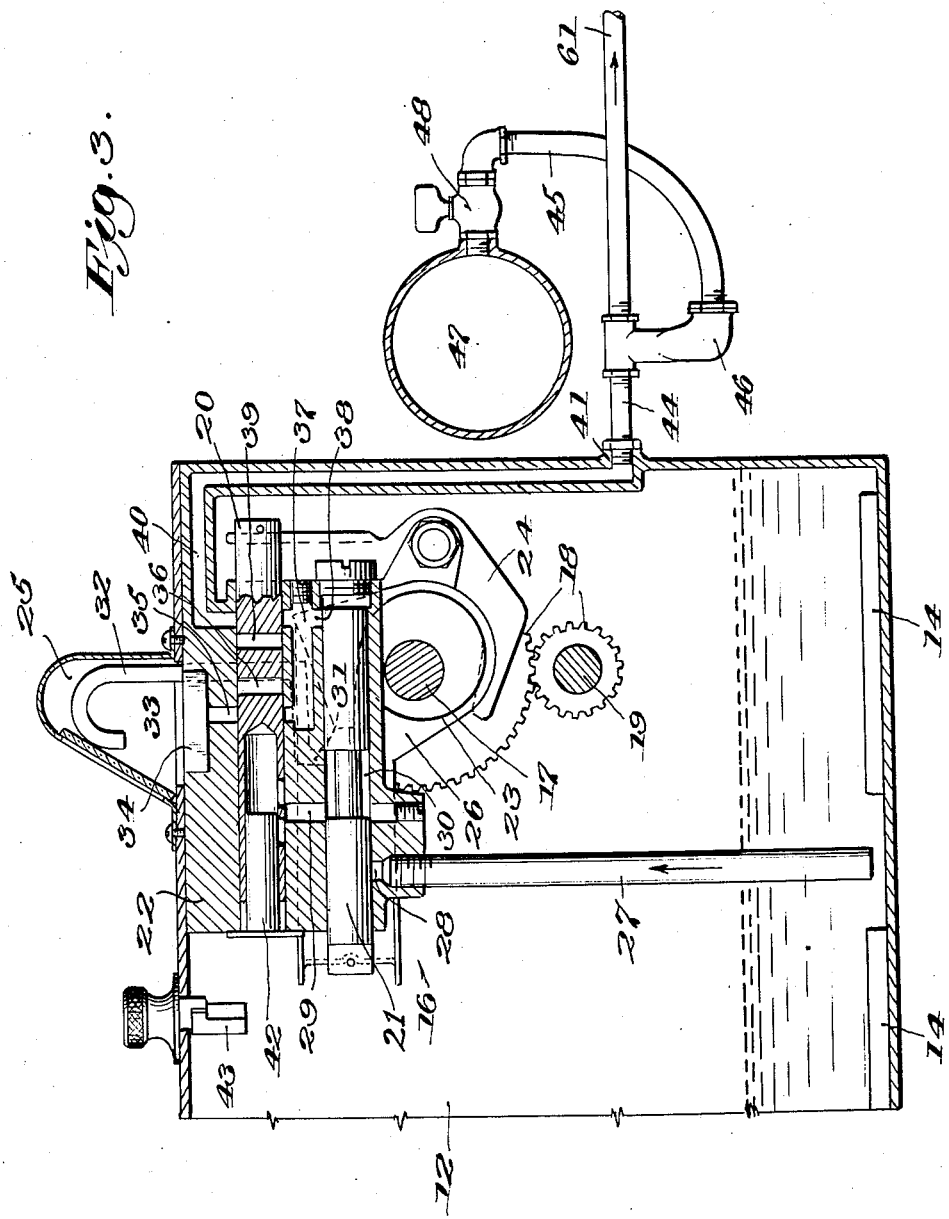

Patented Nov. 3, 1931

1,830,297

UNITED STATES PATENT OFFICE

BRONSON CUSHING SKINNER, OF DUNEDIN, FLORIDA, ASSIGNOR TO BROGDEX COMPANY, OF WINTER HAVEN, FLORIDA, A CORPORATION OF FLORIDA

SPRAYING APPARATUS

Application filed May 13, 1929. Serial No. 362,535.

This invention relates generally to spraying apparatus and it relates more particularly to apparatus for applying to fresh fruit and the like a preservative coating of waxy or other suitable material to maintain it in fresh, plump condition, to protect it against infection by mold or rot organisms, and to improve its general appearance, as well as to attain other desirable results, as will more fully appear hereinafter.

The invention is especially useful in treating fresh fruit such as oranges, lemons, grapefruit, tangerines, apples and the like, but other fruits and also vegetables may be treated as well and therefore the term fruit as used herein is to be understood as including not only fruits proper but also vegetables and the like.

In the treatment of fruit to which this apparatus relates a normally solid preservative material is applied to the fruit in the form of a fine spray, more particularly in the form of a mist or fog produced by atomizing or nebulizing the preservative material in liquid form, the mist or fog, when it contacts with the fruit, depositing thereon exceedingly fine particles of the preservative material to form a thin coating, the fruit being then advantageously subjected to a rubbing or brushing action to spread this coating uniformly over its surface.

The preservative material or composition which is to be applied to the fruit is preferably waxy in nature and in general, it must be in liquid, or at least in reasonably fluid condition at the time of use in order that it may be atomized or nebulized effectively. Paraffin, either alone or mixed with a solvent and/or other ingredients has been found in practice to be a highly efficient and convenient material to employ and therefore, for the sake of a concrete example in explaining the principles of the invention, the use of paraffin will be referred to without, however, intending to limit the scope of the invention to such use for the purposes in view.

In view of the fact that paraffin is normally solid and in view of the fact that the coating or film of paraffin applied to the fruit must be very thin, considerable difficulty has been experienced in the past in feeding the paraffin uniformly and in the small quantities required to apply a thin even coating to the fruit. Clogging of the feed pipes due to cooling and consequent thickening or solidification of the paraffin has been a frequent cause of trouble and because it was not possible to readily observe the feeding, failure in the feeding of the paraffin would frequently continue for some time before the operator became aware of it. Furthermore, a fine adjustment of the feeding was impossible.

A general object of the invention is to provide an arrangement of apparatus operative to effect application of the preservative material to the fruit in the form of a mist or fog in a relatively uniform manner but in suitably limited quantity so that the desired thin film-like coating may be obtained with dependability and uniformity.

A further and more specific object is to provide simple means readily adjustable to apply the preservative material in the quantity and manner best adapted for the purposes in view.

Still another object is to provide apparatus for applying preservative material to fruit in which the feeding of the preservative material to be applied and the quantity being fed can be readily observed at all times.

Other objects and novel features and advantages of the invention will become apparent from the following description taken in conjunction with the acompanying drawings which illustrate one practical form of apparatus embodying the invention, it being understood that the description of this specific embodiment is merely illustrative and not restrictive.

In the drawings:

Fig. 1 is a side view in elevation of apparatus embodying the invention,

Fig. 2 is a plan view and

Fig. 3 is a fragmentary enlarged longitudinal sectional view of one end of the atomizer unit.

Referring to the drawings, the particular form of apparatus therein shown for purposes of illustration comprises atomizer or nebulizer apparatus indicated generally by 10 and fruit rubbing or polishing means indicated generally by 11.

The atomizer or nebulizer unit 10 comprises in this instance a container or receptacle 12 for the preservative material or composition which is to be applied to the fruit. Tank or reservoir 12, which has a hinged cover 13, is provided with suitable means for melting the paraffin and maintaining it in molten or fluid condition and in the example illustrated the heating means comprises electric heating coils 14 which rest on the bottom of the tank 12, said heating means being controlled by the switch 15.

Mounted within container or tank 12 adjacent one end thereof, are means for positively feeding the paraffin, in fluid condition, from tank 12 to the spray devices.

In the example illustrated, the feeding means, indicated generally by 16, comprises a series of mechanical pumps all operated from a common shaft 17, which in turn is driven through the medium of gears 18 from a drive shaft 19 extending out from tank or casing 12. All of the pumps of the series are of the same construction, and are arranged side by side along the shaft 17, from which they are driven. Each comprises a pair of pistons 20 and 21 operating in ported cylinders preferably formed in an integral casting 22 secured to the cover 13 of the tank 12. The construction is such that each piston performs the double function of a plunger for propelling the liquid paraffin and a valve for controlling the ports of the cylinder for the other piston. Piston 20, which is driven from an eccentric 23, mounted on shaft 17, through the medium of a bell crank lever 24, operates to raise the liquid paraffin from the tank 12 and propel it to the sight feed 25, the piston 21, also driven by the eccentric 23 through the medium of the connecting rod 26, cooperating in the control of the ports, piston 21 pumping the liquid paraffin from the sight feed and propelling it to the atomizing nozzle through the cooperation of the piston 20 controlling its ports. In order that these pistons may each properly perform this double function, they are driven so that the point of reversal of one will be substantially at the mid-stroke of the other, this being effected by reason of the change in direction of the movement effected by the bell crank.

The liquid paraffin or other preservative material is conducted from the bottom of the tank to the piston 20 through the riser tube or pipe 27, which communicates with a port 28 in casting 22, and this port, which is controlled by piston 21, is placed in communication with a port or passage 29 leading to the cylinder of piston 20 by an annular groove 30 in the piston 21, which registers with said ports as said piston 21 approaches one end of its stroke, while at the opposite end of its stroke the same groove 30 establishes communication between the port 29 and a port 31 (shown in dotted lines in Fig. 3) which latter connects with the conduit 32 leading to the sight feed indicated generally by 25. The conduit 32 discharges the preservative liquid through the sight feed chamber 33 into a well 34, which connects with a port 35 in the cylinder of piston 20. This port is connected with a port 36 as piston 20 approaches one end of its stroke and the lubricant is conveyed through this port to a passage 37 leading to a port 38 in the cylinder of the piston 21. As the piston 20 approaches the opposite end of its stroke a port 39 therein establishes communication between the port 37 and a passage 40 leading to the discharge outlet 41 in the side of the tank 12. It will thus be seen that in the complete operation just described, the liquid preservative material is first pumped to the sight feed and then propelled to the discharge outlet through the operation of positive mechanism.

Means are provided for varying the amount of feed and in the example illustrated this is effected by altering the effective stroke of piston 20. As shown, this is accomplished by forming piston 20 hollow at one end and inserting a plug or piston 42 in said hollow end so as to have a limited travel therewith. The amount of travel is determined by an adjustable stop 43, preferably a rotatable cam, mounted in the cover 13 of tank 12. When this cam is adjusted in one position, it will hold the plug 42 stationary and consequently the whole stroke of piston 20 will be effective, but, by adjusting the stop away from the plug, a limited lost motion will be provided and the effective stroke of the piston diminished a corresponding amount. The arrangement just described makes it possible to secure a very fine adjustment of the feeding and this adjustment can be made very quickly; likewise, the amount being fed can be observed at all times.

From the discharge outlet 41, the preservative liquid passes into a pipe or conduit 44 where it is atomized or nebulized by air or similar fluid under pressure introduced into the conduit 44 through a pipe 45, a check valve 46 being provided at the junction of pipes 44 and 45 to prevent liquid from entering pipe 45. Air pipe 45 is connected to a manifold or header 47 by a valve 48. The manifold or header 47 is supplied with air under pressure by a pump or blower 49 connected to the header by means of the piping 50, the pump being driven by the chain 51 connected to the electric motor or similar source of power 52 controlled by a switch 53. Motor 52 also operates the pumps of the feeding mechanism 16 by means of belt 54 and pulleys 55 and 56, mounted on drive shaft 19 and air pump shaft 49a respectively. As it is desirable to heat the air used for atomizing the paraffin, an electric heater 57 controlled by the switch 58 is connected in the piping 50. In order to prevent excess air pressures, an adjustable relief valve 59 is connected in the piping 50. A valve 60 is provided for the purpose of cutting off relief valve 59 should this become necessary or advisable. The air, supplied at any desired pressure through pipe 45, atomizes or breaks up the molten paraffin supplied through pipe 44 and the mist or fog thus produced is conducted through pipe 61 to the nozzle 62.

The foregoing description of the pumps etc. applies equally well to the other series of pumps, pipes and nozzles, of which four series have been illustrated, but it is obvious that any desired number can be used.

The fruit rubbing or polishing unit previously referred to generally by 11 may be of any suitable construction within the broad scope of the invention, but the construction somewhat diagrammatically illustrated in the drawings is especially desirable. It comprises revoluble brush rolls 63 and 64 which in this instance are substantially horizontal but which may be gently inclined upwardly or downwardly toward the delivery or discharge end of the rubbing unit. The two brush rolls 63 and 64 are spaced apart somewhat and are mounted for rotation in suitable bearings provided in end sills or cross-pieces 65 and 66 of the supporting framework indicated generally at 67. Disposed in the space between the brush rolls is an endless conveyor mechanism comprising an endless chain 68, running over sprockets 69 and 70. Secured to the endless chain are fruit advancing or conveyor blocks 71 which are most desirably of an inverted V-shaped cross-section and the sloping upper sides of which are faced with horsehair or other suitable bristles similar to the bristles of the brush rolls 63, 64. The brush blocks 71 are individually secured to the conveyor chain in any suitable manner whereby they will not interfere with the free movement and flexibility of the endless conveyor mechanism as a whole. The upper run of the endless chain brush block conveyor slides upon the stationary support indicated at 72 and the lower run slides upon a similar support 73. The brush block conveyor and the cooperating brush rolls are driven by any suitable mechanism not shown.

It will be seen that the upper run of the endless brush block conveyor mechanism cooperates with the brush rolls 63, 64 to provide two trough-shaped runways for fruit. Fruit to be treated is fed to these runways by the endless conveyor 74 and delivery boards 75. The arrangement of the parts is such that the fruit is supported in proper position by the cooperating brushing surfaces of the rolls and the conveyor; and as the brush block conveyor travels toward the right or discharge end of the unit, while the brush rolls are rotated at suitable speed, each fruit is caused to turn or spin on a continuously changing axis and is simultaneously advanced toward the aforesaid discharge end of the unit.

The mist or fog of paraffin obtainable by proper operation of the atomizer or nebulizer 10 is directed into each of the fruit runways, a nozzle 62 being provided for each runway, so that as the fruit enters the runways it is sprayed with the paraffin in finely divided form. The rotating brush roll surfaces and the rectilinearly moving brush block surfaces cooperate in a particularly effective manner to thoroughly rub or brush the surface of the fruit which has been sprayed with the molten paraffin so that the fine particles of paraffin which have been deposited on the fruit are spread out to form a uniform coating of the thin film-like character desired. The polisher brush rolls are preferably enclosed in a suitable housing or other covering means indicated generally at 76; and electric heaters or other appropriate heating means 77 may be provided in said housing to an extent sufficient to maintain the paraffin coating on the fruit soft or even substantially liquid and thus facilitate its being spread in a thin film all over the fruit. The heating means are preferably located just below the polisher rolls and the heating effect can be controlled by suitable switches. Where the polisher rolls are housed as here indicated, the fruit is delivered from the discharge ends of the runway through suitable apertures in the housing, each guarded by a flexible flap 78 and if desirable similar flaps can be used to guard similar apertures in the inlet end of the unit. It is to be observed that the paraffin mist or fog produced in the manner described is rather persistent in character, with the result that the entire interior of the housing is filled with it, so that the fruit is exposed to contact with said mist or fog during the entire time it is passing through the rubbing or polishing unit. The fruit which is discharged from the rubbing or polishing unit 11 is delivered to an endless conveyor 79 by which it is conveyed in the usual packing and grading mechanism.

The foregoing description of brush rolls and brush block conveyor applies equally well to the other brush rolls and cooperating conveyor illustrated. Although a four runway rubbing or polisher unit has been disclosed, it is obvious that a larger or smaller unit can be used equally well.

What is claimed is:

1. Apparatus for treating fruit or the like which comprises the combination, with mechanism for rubbing or brushing fruit, of means operatively adjacent said mechanism for atomizing or nebulizing protective material into contact with said fruit comprising a sight feed, a pump for supplying protective material to said sight feed, a second pump receiving protective moterial from said sight feed, and a compressed air nozzle device supplied with protective material by said second pump.

2. Apparatus for treating fruit or the like which comprises the combination, with mechanism for rubbing or brushing fruit, of means for atomizing or nebulizing protective material into contact with fruit being treated by said mechanism, said means including a container for liquid protective material, heating means for said container, a compressed air nozzle device, a sight feed, a pump for supplying liquid material from said container to said sight feed, a second pump receiving liquid material from said sight feed and delivering it to said nozzle device, means for feeding air to said nozzle device, and means for heating said air.

3. Apparatus for treating fruit or the like which comprises the combination, with mechanism for rubbing or brushing fruit, of means operatively adjacent said mechanism for atomizing or nebulizing protective material into contact with said fruit comprising a compressed air nozzle device, a sight feed, a tank, a pump which takes liquid from the tank and delivers it to the sight feed, a second pump which takes the liquid from the sight feed and delivers it to said nozzle device, and means for varying the amount of liquid delivered.

4. Spraying apparatus comprising a nozzle, means for supplying air to said nozzle, and means for supplying liquid to said nozzle comprising a sight feed, a pump for supplying liquid to said sight feed, and a second pump receiving liquid from said sight feed and delivering it to said nozzle.

5. Spraying apparatus as set out in claim 4 including means for regulating the amount of liquid delivered by the first-mentioned pump to said sight feed.

6. Apparatus for coating fruit or the like comprising, in combination, a nozzle device, means for feeding air to said nozzle device, and means for supplying liquid to said nozzle device comprising a source of liquid supply, a sight feed, means for supplying a predetermined amount of liquid to said sight feed from said source of liquid supply, and means receiving said predetermined amount of liquid from said sight feed and forcing it to said nozzle device.

7. Apparatus for coating fruit or the like comprising, in combination, a nozzle device, means for feeding air to said nozzle device, means for heating said air, and means for supplying liquid to said nozzle device comprising a container for liquid, heating means for said container, a sight feed, a pump for supplying liquid from said container to said sight feed, a second pump receiving liquid from said sight feed and delivering it to said nozzle device, and means for varying the amount of liquid delivered by the first-mentioned pump.

In testimony whereof I hereunto affix my signature.

BRONSON CUSHING SKINNER.